United States Patent [19]

Alexeff

[11] Patent Number: 4,459,511
[45] Date of Patent: Jul. 10, 1984

[54] MASER

[76] Inventor: Igor Alexeff, 2790 Turnpike, Oak Ridge, Tenn. 37830

[21] Appl. No.: 377,152

[22] Filed: May 11, 1982

Related U.S. Application Data

[63] Continuation-in-part of Ser. No. 205,992, Nov. 12, 1981.

[51] Int. Cl.³ .............................................. H01J 25/00
[52] U.S. Cl. ............................................ 315/4; 315/3;
      315/5; 315/111.21; 372/87; 372/92
[58] Field of Search ...................... 315/3, 4, 5, 111.2;
      328/233; 313/231.31, 231.41; 372/87, 92

[56] References Cited

U.S. PATENT DOCUMENTS

| | | | |
|---|---|---|---|
| 2,402,184 | 6/1946 | Samuel | 315/4 X |
| 2,843,732 | 7/1958 | Johnson et al. | 315/5 |
| 2,849,650 | 8/1958 | Quate et al. | 315/4 |
| 2,925,523 | 2/1960 | Weibel | 315/3 |
| 3,184,632 | 5/1965 | Weibel | 315/4 |
| 3,249,793 | 5/1966 | Welker et al. | 315/5.34 |
| 3,378,723 | 4/1968 | Napoli et al. | 315/3 |
| 3,484,602 | 12/1969 | McIraith | 372/87 |
| 3,484,619 | 12/1969 | Proud, Jr. | 315/39 |
| 3,521,117 | 7/1970 | Schmidt | 315/3 |
| 3,521,119 | 7/1970 | Ahmed et al. | 315/39 |
| 3,569,825 | 3/1971 | Lilienfeld | 372/87 |
| 3,621,454 | 11/1971 | Meeks | 372/87 |
| 3,970,956 | 7/1976 | Bolduc | 372/87 |
| 4,070,595 | 1/1978 | Miller | 328/233 |
| 4,080,549 | 3/1978 | Creedon et al. | 313/231.31 |
| 4,150,340 | 4/1979 | Kapetanakos et al. | 315/3 |
| 4,213,073 | 7/1980 | Mahaffey et al. | 328/233 |
| 4,291,255 | 9/1981 | Alexeff | 315/4 |
| 4,345,220 | 8/1982 | Sullivan | 315/39 |

Primary Examiner—Saxfield Chatmon
Attorney, Agent, or Firm—Luedeka & Neely

[57] ABSTRACT

A method and apparatus for generating microwave radiation includes a cathode, comprising parallel side wall means, a first end wall and a second end wall parallel to the first end wall, which defines a space. An aperture is defined within each of the end walls. An elongated anode extends across the defined space and outwardly through the apertures. Free electrons are generated adjacent to the anode and a positive potential is applied between the cathode and the anode. Electrons are trapped in a surrounding relation with the anode and microwave radiation is generated. In an alternate embodiment, a pair of spaced-apart radial steps in the radius of the anode is used to replace the first and second end walls to form electrostatic mirrors for confining free electrons therebetween.

14 Claims, 7 Drawing Figures

MASER

This application is a continuation-in-part of copending Application for United States Letters Patent Ser. No. 205,992 filed Nov. 12, 1981.

The present invention relates to a method and apparatus for generating microwave radiation and more particularly to a voltage tuneable system for producing short wavelength microwave radiation by use of readily available voltages.

Microwave radiation has many present uses beyond the well-known ovens, including long distance communications and radar, for example. Moreover, there are many potential uses for microwave radiation, such as in the development of fusion energy. However, the development of uses for microwave radiation has been retarded through inadequate masers for generating such radiation.

The basic principle of operation of any maser is that electrons oscillate in a system in which the electrons both are confined for a long time and in which the electron frequency varies with energy. Electrons interacting with the noise field in a microwave cavity gain or lose energy, experience a frequency shift, drift in phase, and after some latent period, "phase bunch" and release a coherent burst of radiation. In a free-electron maser, using nonrelativistic electrons trapped in a uniform magnetic field, the frequency is independent of energy, and maser action cannot occur. However, maser action can occur in a free-electron maser if the electrons are made relativistic, so that the relativistic change of mass with energy produces a frequency shift with changing electron energy.

Magnetic systems have frequently been used for generating microwave radiation, however, various ranges of wavelength have proven to be quite difficult to generate on a selective, or tuneable, basis. Microwave radiation having a wavelength of less than about one millimeter has been particularly difficult to generate. Current limits in magnetic field strengh have restricted conventional magnetic field devices to wavelengths greater than about one centimeter.

In order to overcome the deficiencies of current magnetic field devices, efforts have been made to develop a tuneable microwave generator which does not require a magnetic field. U.S. Pat. No. 4,150,340 discloses such an attempt. The apparatus disclosed therein includes a planar cathode and a closely spaced foil anode. Electrons emitted from the cathode oscillate back and forth through the anode. The electrons phase bunch and emit microwave radiation. However, a serious limitation of such a system is the requirement of a high voltage generator capable of producing a 250–350 kilovolt pulse. In addition to the obvious limited availability and great expense of such high voltage generators, the radiation developed by such an apparatus is not suitable for many uses.

The maximum duration of a suitable pulse from such a high voltage generator is quite limited, i.e. on the order of 50 nanoseconds. Longer pulses are unsuitable for the system because the field breaks down. This duration is simply insufficient for many applications, especially where substantially continuous radiation is desired.

Previous work with electrons orbiting electrostatically used quite different physical arrangements such as an electron gun, an electron collector, and a single-pass electron beam. In accordance with the present invention, free electrons are developed within an ion plasma and then trapped in an orbital path around a linear anode by a balance between an electric field and centrifugal force. The electrons are prevented from travelling parallel to the anode by a fringing field (also referred to as an electrostatic mirror) at each end of the anode. In one embodiment of the invention the electrostatic mirrors are formed using two spaced-apart, parallel end walls with the anode passing through a relatively small hole in the approximate center of the end walls. In another embodiment, the electrostatic mirrors are formed by two spaced-apart radial steps in the radius of the anode. This trapping causes the electrons to orbit, travelling a mean free path of many meters, and results in a sufficiently long "latent period" to permit phase bunching to occur and the generation of microwave radiation.

It is an object of the present invention to provide a method and apparatus for generating microwave radiation by use of readily available voltages and materials. It is also an object to provide a method and apparatus for generating microwave radiation for substantially longer durations than heretofore available without magnetic fields. It is an additional object to provide a method and apparatus for generating microwave radiation having a wavelength of less than about one centimeter. Further objects and advantages will be apparent when the following description is considered along with the accompanying drawings in which:

FIG. 8 is a side view of another alternate anode having more than two radial steps in the radius of the anode for use in the system of FIG. 4.

Generally, in accordance with the present invention, a sealed container defines a chamber within which an anode and a cathode are located. The container is evacuated to a level of about $10^{-4}$ Torr. The cathode comprises parallel wall means defining a space, a first aperture and opposed second aperture. The anode comprises an elongated wire which extends across the defined space and outwardly through the opposed apertures defined in said cathode. A positive potential is applied between the anode and cathode to develop an ion plasma around the elongated anode. Electrons within the plasma orbit around the anode, ultimately phase bunching and emitting microwave radiation. The frequency of the microwaves is controllable through the voltage applied to the anode and cathode and through selection of the diameter of the anode, which controls the frequency of the orbital motion of the electrons. The microwaves are directionally controllable by means of apertures defined in the cathode or by an antennae.

In an alternate embodiment of the invention the aforementioned parallel wall means and the pair of apertures of the cathode may be replaced by a cathode disposed in a spaced-apart substantially parallel relationship with the anode and being configured to form an open ended chamber at least partially encompassing the anode that functions as a microwave cavity resonator. In this embodiment, the anode includes a pair of spaced-apart radial steps in the radius of the anode for forming electrostatic mirrors to confine the free electrons rotating about the anode between the steps.

Figure 1:
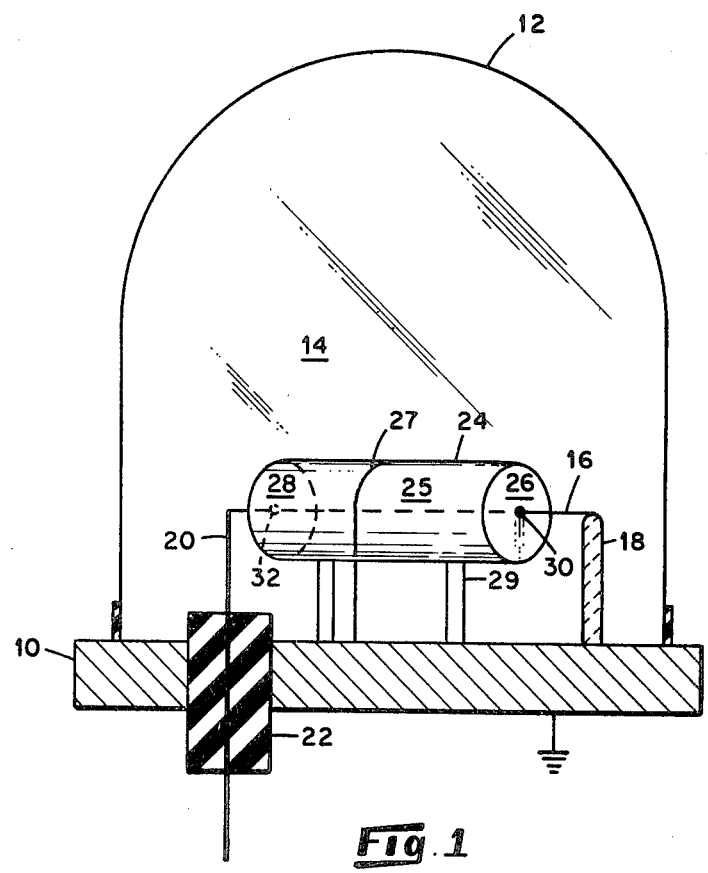
FIG. 1 is a schematic diagram of an apparatus embodying various of the features of the present invention.

Referring more specifically to FIG. 1, there is depicted a system embodying various of the features of the present invention. An aluminum base plate 10 and a glass bell jar 12 cooperatively comprise a container which defines a sealed chamber 14 suitable for maintaining an evacuated atmosphere of air at about $10^{-4}$ Torr. Alternatively, the chamber 14 may be backfilled with nitrogen or argon, for example. A conventional vacuum pump (not shown) is connected to the sealed container for evacuating the container.

The anode 16 is stretched tight within the chamber 14 between a high voltage insulator 18 and a conducting post 20. This arrangement ensures that the anode 16 is maintained in a linear configuration. The insulator 18 is mounted upon the base plate 10, which is grounded, and the post 20 extends through a second high voltage insulator 22 sealingly mounted in the base plate 10. The conducting post 20 is electrically connected to the positve side of a standard high voltage power supply (not shown), which is capable of producing about 30 kilvolts.

The anode 16 comprises a smooth copper wire having a diameter of about 5 mils, but may range between about one and about 15 mils. The anode may also comprise other conducting metals such as tungsten, for example. As will be discussed more fully hereinafter, the diameter of the anode 16 is selected in accordance with the desired frequency of the radiation to be generated.

The anode 16 extends through a substantially enclosed hollow cathode 24. In the depicted embodiment, the cathode 24 comprises a cylindrical tube so that each section of the side wall 25 is parallel to the opposing section of the side wall 25. Alternatively, the side walls of the cathode may comprise a pair of parallel plates. The cathode 24 is enclosed with a planar first end wall 26 and a planar second end wall 28 to define an enclosed space. The end walls 26 and 28 are parallel to one another and perpendicular to the axis of the cathode 24. Apertures 30 and 32 are defined in the end walls 26 and 28, respectively. The apertures 30 and 32 are opposed to one another and axially aligned with the axis of the cathode 24. The apertures are about ⅛ inch in diameter to permit the anode 16 to pass axially therethrough without contacting the cathode and with sufficient space to prevent arcing in the evacuated atmosphere of the chamber 14.

The cathode 24 comprises a non-magnetized metal such as aluminum or copper. In one embodiment, an aluminum beer can, having a length of about 6 inches and a diameter of about 3 inches, was successfully used as a cathode 24 by drilling holes approximately ⅛ inch in diameter in the top and bottom of the can to empty the contents and insert the anode wire.

The cathode 24 is fixedly mounted within the chamber 14 by means of a rubber band 27 holding it to a lucite slab 29.

Figure 2:
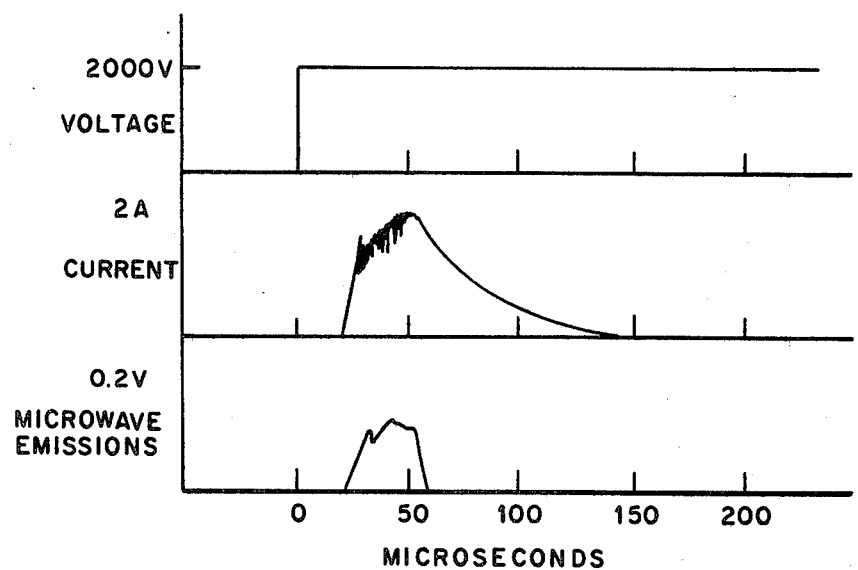
FIG. 2 is a graph illustrating the generation of microwave radiation in accordance with the present invention.

In operation, a positive potential of at least about 500 V is developed between the anode and cathode by applying a square wave pulse of two kilovolts, for example, to the anode 16. As illustrated in FIG. 2, a short period of time, i.e. about 20 microseconds, elapses after the voltage is applied before a current flow of about 2 amps develops and intense microwave emission develops. The elapsed time decreases with an increased gas pressure and quantitatively is consistent with the build up of an ionizing electron cloud by a rotating electron avalanche. Whereas in the depicted embodiment electrons are generated within an ion plasma, alternative techniques, such as a heated filament may be used to generate electrons for orbiting the anode. The current and microwaves continue for a period of about 20 microseconds. The emitted radiation escapes from the chamber via the anode. The radiation intensity and polarization patterns indicate that the anode wire acts as a simple antenna.

The peak frequency of the emitted radiation is dependent upon both the wire size and the applied voltage. As a result, the generator is tunable by varying either the wire size, the applied voltage or both. For example, employing a wire having a diameter of about 5 mils, microwave radiation having a wavelength range of about 3 cm. was generated. Under similar conditions, an apparatus including a wire having a diameter of about 3 mils generated radiation having a wavelength of about 8 mm.

Figure 3:
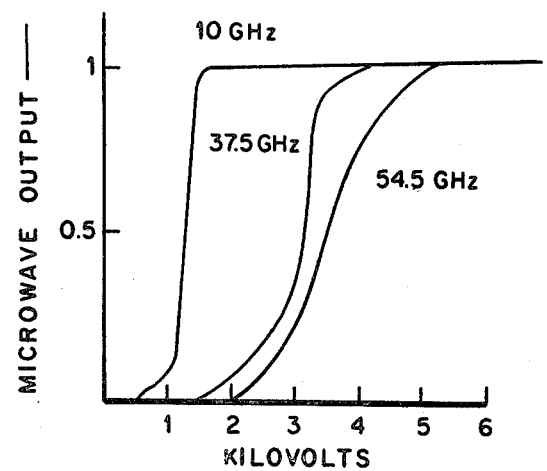
FIG. 3 is a graph illustrating the frequency dependence upon voltage of microwave radiation generated in accordance with the present invention.

As illustrated in FIG. 3, the output of a given frequency of microwave radiation is dependent upon the voltage applied to the system.

It has also been determined that the amount of radiation emitted by a generator in accordance with the present invention increases in proportion to the square of the number of anode wires extending through the cathode. Theory predicts that the orbiting electrons around each wire phase-lock within the chamber, giving the observed results.

In contrast to magnetic field devices, the microwave radiation output of the present invention is increased as the magnetic field is reduced. That is, not only is it better not to apply a magnetic field, but in fact is preferred to reduce the effects of the earth's magnetic field. As a result, the entire chamber is preferably surrounded with a magnetic field shield, such as a cylinder of Mu metal. Employing such shielding, microwave emission occurs as a chain of pulses, a quasi steady state operation with a direct current 50 mA feed.

Employing an apparatus in accordance with the present invention, pulses of microwave radiation having a duration of about 40 microseconds have been produced at a rate of 10,000 pulses per second for fifteen minutes. The microwaves have a wavelength of about 3 cm. Moreover, the apparatus is tunable by varying the potential applied or the diameter of the anode. It is believed that a single wavelength pulse can be produced by the use of a multi-layer narrow band dielectric mirror as a portion of the cathode parallel walls. A single wavelength can also be developed by stimulating emission with an input signal. In this manner the disclosed microwave generation system can be employed as an amplifier for microwave radiation. Also, intense, short pulses can be developed by adding a Q-spoiling feature to the system. Such Q-spoiling can be achieved with a rotating plate or an absorbing filter which is activated sequentially, for example. In addition the radiation is aimable by selective location of apertures in the cathode and antennae extending therethrough.

Figure 4:
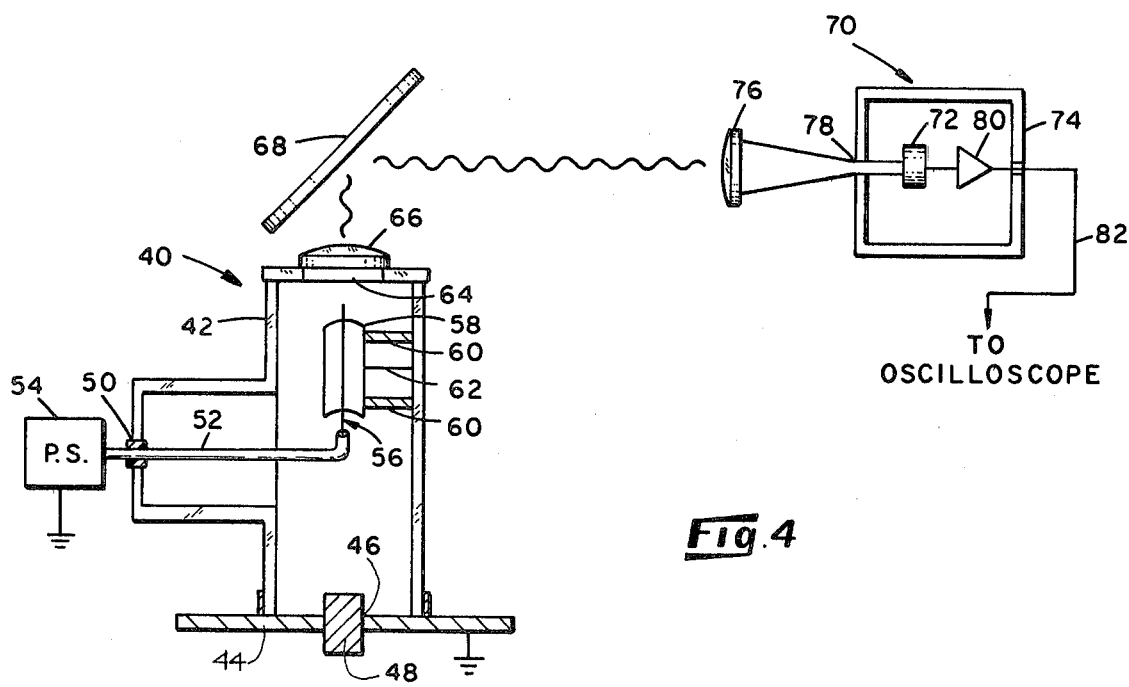
FIG. 4 is a diagramatic cross-sectional view of a microwave generation and detection system constructed in accordance with another embodiment of the invention.

Referring now to FIG. 4, there is shown a diagramatical view of a maser system 40 constituting another embodiment of the present invention. In this embodiment, a maser chamber is formed utilizing a glass T-tube 42 mounted on an aluminum base plate 44. The base plate 44 includes a pump-out aperture 46 and an appropriate plug 48 for selectively sealing the pump-out aperture. The glass T-tube may be evacuated through the pump-out aperture 46 or gases may be introduced into the T-tube 42 through the aperature 46. As in the previously described embodiment, the glass T-tube should be evacuated to approximately $10^{-4}$ Torr or should be backfilled with nitrogen or argon, for example.

The pump-out aperture 46 is located in the lower branch of the glass T-tube 42. The side branch of the glass T-tube includes an appropriate aperture and seal 50 for receiving and sealably engaging an insulated lead-in line 52. The lead-in line 52 extends from an external positive power supply 54 through the aperture and seal 50 to the anode 56 of the maser system 40. The anode has an elongate shape and generally extends in a direction perpendicular to the side branch of the glass T-tube 42 and parallel to the bottom and top branches thereof.

A cathode 58 is mounted within the glass T-tube 42 on lucite mounting slabs 60 and is held thereon by a rubberband 62. Although, the connections are not shown, it will be understood, of course, that the cathode is grounded or electrically interconnected with power supply 54 so that a potential difference developes between anode 56 and cathode 58. The cathode 58, in this embodiment, is a cylinder disposed in a substantially parallel, spaced-apart relationship with and encompassing the anode 56. However, it is noted that the cathode 58 could be configured in alternate shapes, such as a pair of parallel plates. In the embodiment illustrated, the cathode 58 serves the dual function of cathode (electron emitter) and microwave cavity resonator. In alternate embodiments, these two functions could be served by separate units, but the microwave cavity resonator should at least partially encompass the anode 56.

As in the previous embodiment, a positive potential is developed between the anode 56 and cathode 58 by applying a square wave pulse of fifteen kilovolts, for example, to the anode. Microwave emission develops and is transmitted by the anode 56 toward the top branch of the glass T-tube 42. The top branch of the T-tube 42 includes a window 64 that is sealably covered by a plastic microwave lens 66. The microwave emission developed at the anode 56 is transmitted upwardly through the microwave window 64 and towards a microwave reflector 68 that reflects the microwaves toward a microwave detector 70. The detector 70 includes a thin wire bolometer 72 mounted in a "radiation hardened" box 74 with all de-mountable joints stuffed with copper braid and all permanent cracks soldered shut.

The microwave radiation enters the detector 70 through a plastic microwave lens 76 and wave guides 78. The wave guide 78 has a measured cut-off 3 mm so that microwave radiation having a wavelengths greater than 3 mm are not transmitted to the bolometer 72.

The bolometer 72 is relatively insensitive compared to the diodes available for use with microwaves of greater wave lengths, and the response time of the bolometer is relatively slow, in the range of twelve microseconds, as compared to the microwave pulse emission of about one microsecond. However, the advantage of the bolometer 72 is that it is simple and robust.

The output of the bolometer 72 is applied through a preamplifier 80 housed within the radiation hardened box 74, and the output of the preamplifier 80 is transmitted through line 82 to an oscilloscope.

Figure 5:
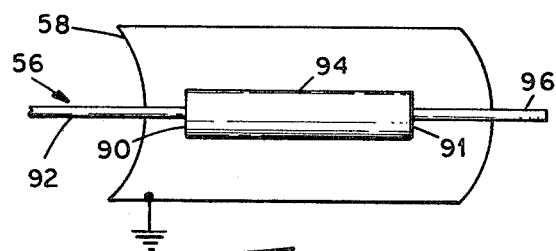
FIG. 5 is a cut-away view of the anode and cathode used in the invention embodiment of FIG. 4.

Referring now to FIG. 5, there is shown a detailed view of the anode 56 and a cut-away view of the cylindrical cathode 58. The anode 56 includes a first radial step 90 in the radius thereof spaced-apart from a second radial step 91 in the anode 56. Thus, the anode 56 is formed by a relatively thin wire portion 92 extending to a radial step 90 where the radius of the anode is abruptly increased. A relatively thick wire portion 94 extends from the first radial step 90 to the second radial step 91 where the radius of the anode is decreased. A relatively thin wire portion 91 extends outwardly from the radial step 91 to a position slightly beyond the cathode 58.

Figures 6, 7:
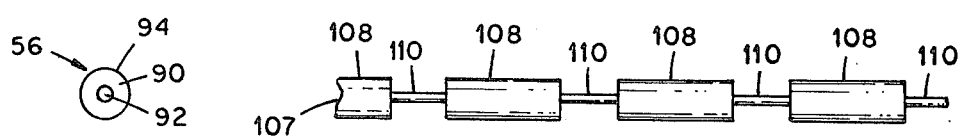
FIG. 6 is an end view of the anode shown in FIG. 5.
FIG. 7 is a side view of an alternate anode that may be used in the system of FIG. 4.

Referring now to FIG. 6, there is shown an end-view of the anode 56. In this view it may be appreciated that the thin wire portion 92 and the thick wire portion 94 are both cylindrical in cross-section and the radial step 90 is annular in shape. The purpose of the step anode 56 is to create electrostatic mirrors at the steps 90 and 91 to prevent electrons rotating about the anode 56 from moving freely in a direction parallel to the wire.

In the embodiment of the invention described with reference to FIG. 1, this electron confinement was provided by the negative end wall 26 and 28. Such design worked well at microwave wavelengths from 3 cm down to approximately 8 mm. However, at wavelengths below 4 mm, it becomes difficult to design and construct an operating maser of the design shown in FIG. 1. The reason for this difficulty appears to be that for very small orbits circling the wire, such as orbits required for high frequency microwave production, the fringing field provided by the end walls 26 and 28 was not satisfactory. It is believed that the end wall electric field lines close to the anode 16 were essentially normal to the direction of the wire so that electrons at small orbits about the anode 16 were unconfined axially along the anode 56.

It was impractical to improve the end wall electric field by making the holes 30 and 32 in the end walls 26 and 28 smaller because wire sag, due to thermal expansion, caused the wire to short-circuit against the end walls. In addition, it is believed that field emissions from negative holes plus shorting between the anode 16 and the end walls 26 and 28 would cause problems.

To provide electrostatic mirrors operable at wave lengths below 4 mm, the anode 56 was provided with the radial steps 90 and 91. Such steps in the radius of the anode 56 provide fringe fields or electrostatic mirrors that provide good axial containment of electrons orbiting about the anode in a relatively small orbit as required to produce microwave radiation at wavelengths below 4 mm.

The radial steps 90 and 91 in the anode 56 may be produced by the technique of electro-chemical etching. The wire is made the anode in a bath of concentrated KOH and a carbon rod is provided as a cathode. Application of 100 milliamps of direct current at about six volts etches the wire in a few minutes. Other techniques for etching wires may also be used. For example, a technique for a rapidly etching multiple steps in an anode is to float a solution of potassium hydroxide on a layer of carbon tetrachloride. The wire anode is disposed to penetrate this layer is made positive relative to the solution and is rapidly etched by the OH ion. Using this process, repetitively etched wire anodes may be manufactured rapidly and easily.

The problem of landau damping and phase mixing due to electron motion parallel to the anode may be further eliminated by placing a chain of electrostatic mirrors along an anode by etching multiple radial steps in the anode wire. In FIG. 7 there is shown an anode wire 107 with multiple alternate wire sections creating a chain of electostatic mirrors. Anode wire 107 includes a plurality of relatively thick wire portions 108 interconnected by a plurality of thin wire portions 110, and an electrostatic mirror is formed at the interface between each thin wire portion 110 and thick wire portion 108. Using the multi-stepped or notched wire at wavelengths of about 3 mm, a power increase by a factor of about one hundred relative to a smooth or non-stepped anode wire was observed.

Using the stepped anode 56 as discussed in conjunction with FIGS. 5-7 in the maser system 40, microwave production at 2 mm is obtained, and it is believed that the maser system 40 will operate at much lower wavelengths. The anode 56 used in the maser system 40 to produce microwave radiation having wavelengths of approximately 2 mm is generated using an anode 56 having thin wire portions 92 and 96 that have diameters of approximately 0.0015 inches with the relatively thick wire portion 94 having a diameter of approximately 0.002 inches. The preferred material for the anode is a smooth tungsten wire. On applying the pulse voltage of about 15 kilovolts from the power supply 54 through the insulated lead-in line 52 to the anode 56, there is the usual "dwell time" as the discharge builds up. Then, the bolometer 52 records an impulsive microwave signal with a rise time of approximately two microseconds. Next, a decay occurs of approximately twenty microseconds due to the thermal response of the bolometer 72 as it returns to room temperature. The radiation produced by the maser system 40 has been observed transmitted by a wire mesh that theoretically should transmit 2 mm radiation, and the radiation is completely cut-off by finer meshes as theoretically predicted. The radiation produced by the maser system 40 in the range of 2 mm wavelengths, will not penetrate metal foil, glass or flesh, but it does penetrate the plastic lens 66 and 76, and such materials as lucite and teflon. The 2 mm radiation as a well defined voltage threshold of approximately 15 kilovolts below which it is not observed.

In the two embodiments disclosed herein, the means for generating the free electrons rotating about the anode is the anode itself. Initially, one or a few random electrons will rotate about the anode and, with gas molecules in the vacuum chamber, an avalanche will occur causing a buildup of the number of electrons rotating about the anode. In another embodiment the free electrons may be provided by other means such as a heated cathode. While preferred embodiments of the present invention have been shown and described herein, it is understood that various changes and modifications may be made without deviating from the spirit or scope of the invention and there is no intention to limit the scope of the invention except as set forth in the following claims.

What is claimed is:

1. A system for generating microwave radiation comprising:
   an elongate anode;
   a cathode disposed in a spaced-apart relationship with said anode;
   means for supplying a selected positive voltage potential to said anode relative to said cathode;
   means for generating free electrons adjacent to said anode for rotation thereabout;
   a microwave cavity resonator at least partially encompassing said anode;
   at least first and second electrostatic mirrors formed at spaced-apart first and second positions, respectively, along said anode for electrostatically trapping free electrons rotating about said anode between said first and second electrostatic mirrors to electrostatically produce a phase bunching in orbit of the electrons and to emit microwave radiation from the microwave cavity resonator; and
   said microwave cavity resonator containing the microwaves to interact with the electrons rotating about said anode.

2. The system of claim 1 wherein said microwave cavity resonator comprises said cathode.

3. The system of claim 1 wherein said means for generating free electrons comprises said anode.

4. The system of claim 1 wherein said cathode is configured to at least partially encompass said anode to function as said microwave cavity resonator.

5. The system of claim 1 wherein said first and second electrostatic mirrors comprise first and second structures formed on said anode in a configuration for producing electrostatic mirrors on said anode for confining electrons between said first structure and said second structure.

6. A system for generating microwave radiation comprising:
   an elongate anode;
   a cathode disposed in a spaced-apart relationship with said anode;
   means for supplying a selected positive voltage potential to said anode relative to said cathode;
   means for generating free electrons adjacent to said anode for rotation thereabout;
   a microwave cavity resonator at least partially encompassing said anode;
   at least first and second electrostatic mirrors formed at spaced-apart first and second positions, respectively, along said anode for confining free electrons rotating about said anode between said first and second electrostatic mirrors, whereby microwave radiation is emitted from the microwave cavity resonator; and
   said first and second electrostatic mirrors comprising first and second steps formed in said anode, the cross-section of said anode being abruptly changed at said steps.

7. The system of claim 6 wherein said anode comprises a wire and said first and second steps comprise first and second radial steps formed in said wire whereby the radius of said wire changes abruptly at said radial steps to form an electrostatic mirror when a voltage potential is applied to said wire.

8. The system of claim 1 wherein more than two electrostatic mirrors are formed at spaced-apart positions along said anode.

9. The system of claim 6 wherein said anode is a metallic wire having at least first and second electrochemically etched steps in the radius of said wire.

10. A system for generating microwave radiation comprising:
   an elongate anode;
   a cathode disposed in a spaced-apart substantially parallel relationship with said anode and being configured to at least partially encompass said anode to form a microwave cavity resonator;
   a vacuum chamber for containing said anode and cathode;
   a window formed in said vacuum chamber for emitting microwave radiation from said vacuum chamber;
   means for supplying a positive voltage potential to said anode relative to said cathode to produce free electrons rotating about said anode;
   at least first and second electrostatic mirrors formed at spaced-apart first and second positions, respectively, along said anode for electrostatically trapping free electrons rotating about said anode between said first and second electrostatic mirrors to electrostatically produce a phase bunching in orbit of the electrons and to emit microwave radiation at said anode from said window; and
   said cathode forming a cavity for containing microwaves to interact with the electrons surrounding said anode.

11. The system of claim 10 wherein said means for supplying a positive voltage comprises:
   a positive power supply;
   an insulated lead-in wire connected between said positive power supply and said anode to apply a positive voltage potential thereto relative to said cathode; and
   means for electrically interconnecting said positive power supply and said cathode.

12. The system of claim 11 wherein said vacuum chamber comprises:
   a glass T-tube having first, second and third branches;
   a pump out aperture formed in the first branch of said T-tube;
   said window being disposed in the second branch of said T-tube;
   a high voltage insulated lead-in wire being disposed in the third branch of said T-tube and extending to said anode.

13. A system for generating microwave radiation comprising:
   an elongate anode;
   a cathode disposed in a spaced-apart substantially parallel relationship with said anode and being configured to at least partially encompass said anode to form a microwave cavity resonator;
   a vacuum chamber for containing said anode and cathode;
   a window formed in said vacuum chamber for emitting microwave radiation from said vacuum chamber;
   means for supplying a positive voltage potential to said anode relative to said cathode to produce free electrons rotating about said anode;
   at least first and second electostatic mirrors formed at spaced-apart first and second positions, respectively, along said anode for confining free electrons rotating about said anode between said first and second electrostatic mirrors whereby microwave radiation is generated at said anode and is emitted from said window;
   said first and second electrostatic mirrors comprising first and second steps in the cross-sectional dimensions of said anode sufficient to form electrostatic mirrors at said steps when a positive voltage potential is applied to said anode relative to said cathode.

14. A method for producing microwave radiation comprising:
   producing a microwave cavity resonator;
   producing free electrons adjacent an elongate anode disposed within the microwave cavity resonator;
   causing the free electrons to rotate about the elongate anode;
   producing first and second electrostatic mirrors at first and second spaced apart positions along the anode;
   electrostatically trapping the free electrons rotating about the anode between the first and second electrostatic mirrors;
   electrostatically producing phase bunching in orbit of the trapped electrons;
   emitting microwave radiation from the microwave cavity resonator; and
   containing the microwaves within the microwave cavity resonator to interact with the trapped electrons.

* * * * *